United States Patent [19]

Skochdopole

[11] Patent Number: 5,091,461
[45] Date of Patent: Feb. 25, 1992

[54] FILLED POLYMERIC BLEND

[75] Inventor: Richard E. Skochdopole, Midland, Mich.

[73] Assignee: The Dow Chemical Company, Midland, Mich.

[21] Appl. No.: 334,411

[22] Filed: Apr. 7, 1989

[51] Int. Cl.$^5$ .................... C08J 3/20; C08K 3/34; C08L 43/04

[52] U.S. Cl. .................... 524/493; 524/445; 524/451; 524/504; 524/505

[58] Field of Search ............... 524/445, 451, 493, 504, 524/505

[56] References Cited

U.S. PATENT DOCUMENTS

| | | |
|---|---|---|
| 4,098,734 | 7/1978 | Lee . |
| 4,476,274 | 10/1984 | Liu . |
| 4,478,964 | 10/1984 | Carter, Jr. ............... 524/445 |
| 4,528,303 | 7/1985 | Seqaud . |
| 4,537,930 | 8/1985 | Bussink et al. ............ 524/505 |
| 4,584,338 | 4/1986 | Liu ....................... 524/505 |
| 4,763,133 | 8/1988 | Takemura . |

FOREIGN PATENT DOCUMENTS 63954 5/1977 Japan .

*Primary Examiner*—Paul R. Michl
*Assistant Examiner*—U. K. Rajguru

[57] ABSTRACT

Filled polymer blends comprising a polycarbonate, a rubber modified copolymer of a vinyl aromatic monomer and from 4 to 18 weight percent of an inorganic filler.

9 Claims, 2 Drawing Sheets

FILLED POLYMERIC BLEND

BACKGROUND OF THE INVENTION

The present invention relates to novel polymeric molding compositions comprising an amorphous polymer matrix and an inorganic filler. More particularly the present invention relates to such a polymeric blend having improved properties, particularly reduced coefficient of linear thermal expansion (CLTE), a high dart impact resistance, and good resistance to the effects of heat. The above composition is particularly useful in the preparation of molded objects particularly parts having large surfaces prepared by injection molding techniques and having predictable finished dimensions and smooth finish. Such properties are particularly desired for exterior automotive body panels.

U.S. Pat. No. 4,098,734 discloses blends comprising a matrix interpolymer, a grafted rubber copolymer, a polymer other than the two foregoing polymers having a solubility parameter in the range of 8.5 to 13 and an inorganic filler. Examples of such blends comprising an ABS resin, about 14 percent of a clay, and polymethylmethacrylate or cellulose butyrate were disclosed. The reference further taught that polycarbonate could also be employed in the blend.

In JP 52 63,954 there are disclosed blends composed of 20 to 45 weight percent of an ABS resin, 45 to 20 weight percent of a polycarbonate resin and from 5 to 30 weight percent talo. Such compositions have been found to lack suitable heat distortion properties and also to be deficient in toughness as measured for example by Dart impact resistance or notched Izod impact values.

In certain applications such as exterior automotive injection molded parts it is desirable to provide low temperature impact resistance as well as reduced coefficient of linear thermal expansion and high temperature distortion resistance all in one polymeric resin. Unless the coefficient of linear thermal expansion (as measured according to ASTM D696) is less than $3.9 \times 10^{-5}/° F.$ over the temperature range of 70° to 120° F. extremes in temperature conditions can result in misfitting of various components of the finished assembly. A door or fender component which expand excessively will in extreme heat conditions result in buckling or misfit in the assembled finished product. Equally important is impact resistance as measured by dart impact resistance, particularly at low temperatures when thermoplastic resins are particularly subject to cracking under impact. Generally improved coefficients of linear thermal expansion can be obtained by the incorporation of increased amount of fillers, however, impact resistance, particularly low temperature impact resistance, is often reduced to unacceptable levels. Fibrous reinforcing additives such as fiber glass are very efficient in lowering the CLTE, however, such fibers typically are visible in the surface of the resulting object thereby producing unacceptable surface properties.

Accordingly it would be desirable if there were provided an improved polymeric blend having both a reduced coefficient of linear thermal expansion while retaining acceptably high dart impact resistance, particularly low temperature dart impact resistance.

In addition it would be desirable if there were provided such an improved polymeric blend that additionally retains a high heat distortion under load such that parts prepared therefrom may be exposed to elevated temperatures without distortion.

SUMMARY OF THE INVENTION

Figure 1:
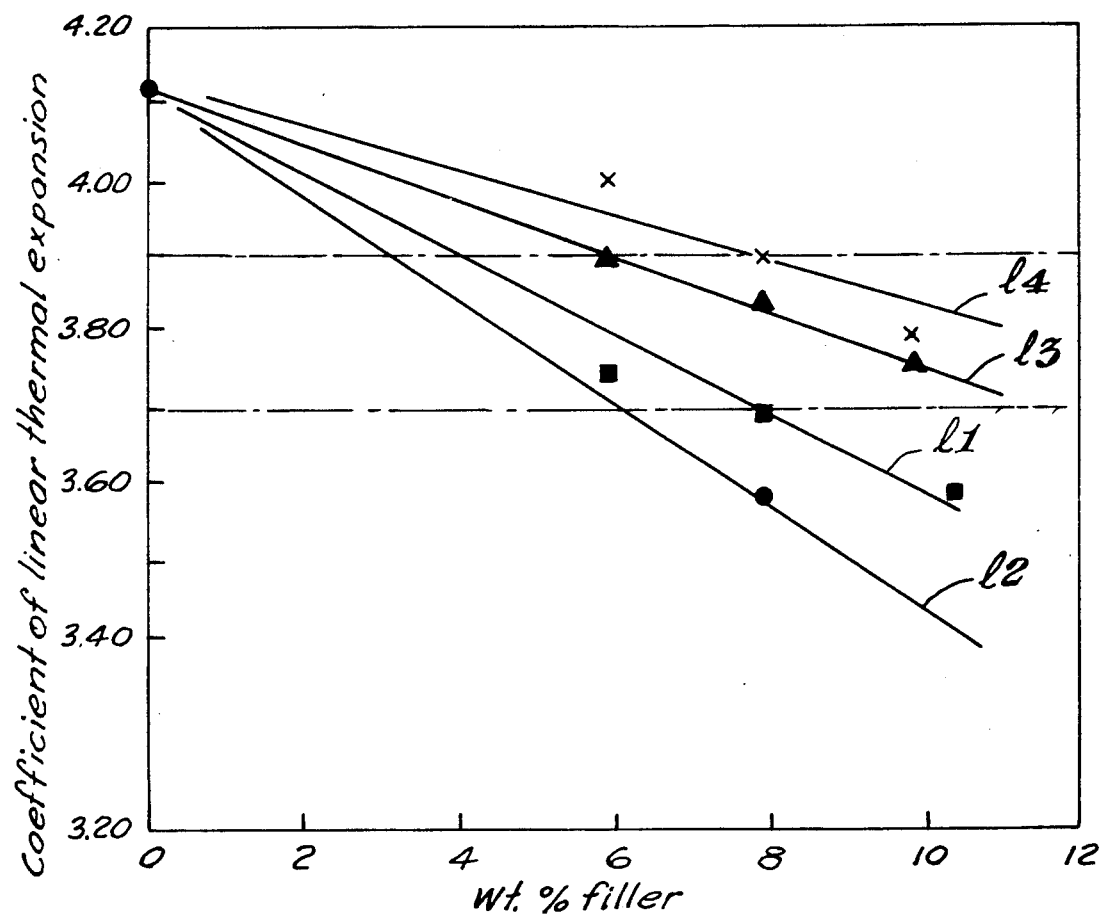
FIG. 1 shows the relationship between CLTE and amount of added filler for 4 selected fillers further defined in Example 4.

According to the present invention there is now provided a filled polymeric blend comprising:

(A) from 50 to 80 percent by weight of an aromatic polycarbonate:

(B) from 5 to 46 percent by weight of a rubber modified homopolymer or copolymer of a vinyl aromatic monomer;

(C) from 4 to 18 weight percent of an inorganic filler selected such that at least 98 percent of the particles thereof in the final blend have a particle diameter (large dimension) less than 44 μm and an average particle diameter/thickness (small dimension) ratio from 4 to 24, said blend having a coefficient of linear thermal expansion (CLTE) of $3.9 \times 10^{-5}/° F.$ $(7.0 \times 10^{-5}/° C.)$ or less, a dart impact ($-20°$ F.) ($-29°$ C.) of at least 100 in lbs (11.3 joules): and a heat distortion under load (DTUL) per ASTM D-648-82 at 66 psi (455 kPa) of at least 230° F. (110° C.).

In measuring CLTE the technique employed is that of ASTM D696. Dart impact strength is instrumented dart impact strength measured according to ASTM D3763-86, with a 5 mile/hour velocity, 0.5 inch diameter dart.

DETAILED DESCRIPTION OF THE INVENTION

The aromatic polycarbonate resins usefully employed according to the present invention are those previously known and described in the prior art. More particularly such resins include the polycarbonate resins obtained by the interfacial polymerization or solution polymerization of a dihydroxyaryl compound, especially a bisdihydroxyarylalkane, with phosgene or a bischloroformate in the presence of methylene chloride and an acid binding agent such as an alkali metal hydroxide or pyridine. Especially well suited aromatic polycarbonates include bisphenol A polycarbonate, tetrabromobisphenol A polycarbonate and tetramethylbisphenol A polycarbonate, 1,1-bis(4-hydroxyphenyl)-1-phenylethane polycarbonate and mixtures thereof.

Rubber modified homopolymers and copolymers of vinyl aromatic monomers include the rubber modified homopolymers and copolymers of styrene or α-methylstyrene with a copolymerizable comonomer. Preferred comonomers include acrylonitrile which may be employed alone or in combination with other comonomers particularly methylmethacrylate, methacrylonitrile, fumaronitrile and/or an N-arylmaleimide such as N-phenylmaleimide. Highly preferred copolymers contain from about 70 to about 80 percent styrene monomer and 30 to 20 percent acrylonitrile monomer.

Suitable rubbers include the well known homopolymers and copolymers of conjugated dienes, particularly butadiene: as well as other rubbery polymers such as olefin polymers, particularly copolymers of ethylene, propylene and optionally a nonconjugated diene, or acrylate rubbers, particularly homopolymers and copolymers of alkyl acrylates having from 4 to 6 carbons in the alkyl group. In addition, mixtures of the foregoing rubbery polymers may be employed if desired. Preferred rubbers are homopolymers of butadiene and copolymers thereof with up to about 30 percent by weight styrene. Such copolymers may be random or block copolymers and in addition may be hydrogenated to remove residual unsaturation.

The rubber modified copolymers are preferably prepared by a graft generating process such as by a bulk or solution polymerization or an emulsion polymerization of the copolymer in the presence of the rubbery polymer. In the emulsion polymerization to form graft copolymers of rubbery substrates it is previously known in the art to employ agglomeration technology to prepare large and small rubber particles containing the copolymer grafted thereto. In the process various amounts of an ungrafted matrix of the copolymer are also formed. In the solution or bulk polymerization of a rubber modified copolymer of a vinyl aromatic monomer, a matrix copolymer is formed. The matrix further contains rubber particles having copolymer grafted thereto and occluded therein.

A particularly desirable product comprises a rubber modified copolymer blend comprising both the mass or solution polymerized rubber modified copolymer and additional quantities of an emulsion polymerized and preferably agglomerated rubber modified copolymer containing a bimodal particle-sized distribution. A most preferred rubber modified copolymer comprises a butadiene rubber modified copolymer. Butadiene rubber modified copolymers of styrene and acrylonitrile are referred to in the art as ABS resins.

To obtain a resulting polymeric blend meeting the requirements of the present invention it is desirable to employ specific concentrations of suitable fillers having elongated structures. It has now been discovered that spherical shaped fillers lack ability to lower the CLTE of resulting polymer blends compared to elongated fillers. The measurement of the filler large dimension/small dimension (diameter/thickness) ratio can best be done by first preparing a thin section by freeze microtoming and then preparing an electron photomicrograph of 3000 to 15000 × magnification. By measuring the diameter/thickness of a representative sample of at least 25 and preferably 50 filler particles one can obtain a relatively accurate value for the diameter/thickness ratio. The percentage of the filler below 40 $\mu$m diameter can be measured by screen analysis using a 325 mesh screen. Alternatively filter ave particle size can be determined by use of sedimentation analysis techniques sec. Transactions of ASAE, p 491 (1983).

Preferred compositions according to the invention are those containing from 5 to 15, more preferably from 6 to 12 percent of one or more inorganic fillers 99 percent of which has an average particle diameter less than 20 $\mu$m. Highly preferred are those compositions incorporating fillers having an average diameter/thickness ratio (D/T) as measured according to the foregoing technique of from 6 to 18. Preferred fillers are uncalcined talcs and clays having very low free metal oxide content.

Preferred compositions according to the present invention comprise 55 to 75 percent by weight aromatic polycarbonate and 10 to 40 percent by weight of rubber modified homopolymer or copolymer and possess a dart impact at −20° F. of at least 200 in-lbs (22.6 joules),
a CLTE of less than $3.7 \times 10^{-5}/°$ F. and a DTUL of at least 250° F. (121° C.).

The compositions are prepared by blending the foregoing components A, B and C. Desirably the components may be first mixed or dry blended prior to melt blending in an appropriate extruder or other melt blending device. The components may be combined and blended in any order. In addition to the foregoing components, additional additives such as coupling agents, for example the polyfunctional organosilicon compounds disclosed in U.S. Pat. No. 4,528,303 may be included in the blend. Pigments, antioxidants, processing aids, flame retardants, lubricants, mold release agents, and other additives may also be included in the composition.

Generally the addition of increased amounts of polycarbonate results in a final composition having improved DTUL. However, use of an excessive amount of polycarbonate results in redubtion of dart impart strength. Injection molded components prepared from the resin blends of the present invention generally have an exceptionally smooth, defect free surface finish. In addition the compositions show improved resistance to hydrocarbon solvents such as gasoline compared to polycarbonate resins.

In addition to the foregoing components, the polymeric blends may be further compounded with additional amorphous polymers. Examples of additional polymeric components with which the present composition may be further blended include the thermoplastic polyurethanes, amorphous polyesters, and polyarylate resins.

Having described the invention the following examples are provided as further illustrative and are not to be construed as limiting. Parts and percentages are based on weight.

Example 1

Runs 1–4 and Comparative

A polycarbonate/ABS blend containing 64 percent bisphenol A polycarbonate, 36 percent of a mass polymerized polybutadiene modified ABS resin containing 20 percent rubber, 23 percent acrylonitrile and 57 percent styrene was dried for 4 hours at 210° F. (99° C.) in a circulated air dryer and then mixed in a polyethylene bag with 0.1 percent epoxidized soybean oil, 0.1 percent trisnonyl phenyl phosphite (TNPP) and various amounts of an uncalcined clay (Tex 10R, available from Anglo-American Clay Company). The mixtures were then extruded through a Warner Pfleiderer ZSK-30 twin screw extruder The heaters were maintained at 518° F. (270° C.), the screw was run at 400 RPM, and the throughput rate was about 30 lbs/hour (13.6 Kg/hr). Strands were cooled in a water bath and chopped. The granules were then dried for 4 hours at 210° F (99° C.) in a circulated air oven and molded into test specimens in an Arburg 28 ton injection molding machine at 550° F. (288° C.) melt temperature and 180° F. (82° C.) mold temperature. The physical properties of the resulting injection molded samples were then measured. In the resulting blend, greater than 99.99 percent of the particles had a diameter less than 44 $\mu$m. The average particle diameter/thickness was 14.3. Test results are contained in Table 1.

TABLE 1

| Run | Poly-carbonate (%) | ABS (%) | Filler (%) | DTUL (°C.) | CLTE (×10⁻⁵/°F.) | Dart Impact (−29° C.) (In lbs) |
|---|---|---|---|---|---|---|
| 1 | 66 | 32 | 4 | — | 3.81 | 484 |
| 2 | 63 | 31 | 6 | — | 3.43 | 370 |
| 3 | 61.6 | 30.4 | 8 | — | 3.51 | 314 |
| 4 | 60.3 | 29.7 | 10 | 128 | 3.44 | 350 |
| a | 67 | 33 | 0 | — | 4.2 | 528 |

Example 2

Run 5 and Comparative b

The polycarbonate/ABS blend employed in Example 1 was blended with 6 percent each of two clay samples having diameter/thickness ratios shown in Table 2. These formulations were also molded substantially according to the technique of Example 1. The results of testing are shown in Table 2. The composition incorporating a clay having average particle thickness ratio of 16.3 had CLTE of $3.65 \times 10^{-5}/°$ F. compared to $4.28 \times 10^{-5}/°$ F. for compositions incorporating the clay having diameter/thickness ratio of 2.8. All samples have the desired DTUL and dart impact values at $-20°$ F. ($-29°$ C.).

The diameter (or longest dimension) of the fillers as well as their thickness (shortest dimension of the 2 dimensions measurable) were measured from transmission election photomicrographs (7500×) of microtome slices of the injection molded samples that had been exposed to accentuate the filler phase. The diameters and thicknesses of the fillers were measured manually with sample sizes of from twenty to fifty particles.

TABLE 2

| Run | Polycarbonate (%) | ABS (%) | Clay (%) | D/T | CLTE (×10⁻⁵/°F.) | % <44 μm |
|---|---|---|---|---|---|---|
| 5 | 59 | 35 | 6 | 16.3[1] | 3.65[3] | 99.99 |
| b | 59 | 35 | 6 | 2.8[2] | 4.28 | 99.98 |

[1]XF-3600 available from Anglo American Clay Co.
[2]Translink 555 available from Englehard Ind.
[3]Average of two samples.

Example 3

Runs 5-13

A polycarbonate/ABS blend was blended in a similar fashion as in Example 1 with a number of types of talc all having >99.99 percent of particles less than 44 μm. The results of testing of these samples are shown in Table 3. It is seen that all samples containing 6 to 10 percent talc have the desired values of CLTE and dart impact at $-20°$ F. ($-29°$ C.).

TABLE 3

| Run | Polycarbonate (%) | ABS (%) | Filler (%) | D/T | DTUL (°C.) | CLTE (×10⁻⁵/°F.) | Dart Impact (−29° C.) |
|---|---|---|---|---|---|---|---|
| 5 | 63 | 31 | 6[1] | 9.0 | — | 3.83 | 534 |
| 6 | 63 | 31 | 6[2] | 13.8 | — | 3.67 | 413 |
| 7 | 63 | 31 | 6[3] | 12.3 | — | 3.86 | 514 |
| 8 | 61.6 | 30.4 | 8[1] | 9.0 | — | 3.54 | 461 |
| 9 | 61.6 | 30.4 | 8[2] | 13.8 | — | 3.40 | 423 |
| 10 | 61.6 | 30.4 | 8[3] | 12.3 | 125 | 3.65 | 365 |
| 11 | 60.3 | 29.7 | 10[1] | 9.0 | — | 3.36 | 485 |
| 12 | 60.3 | 29.7 | 10[2] | 13.8 | — | 3.36 | 362 |
| 13 | 60.3 | 29.7 | 10[3] | 12.3 | — | 3.10 | 464 |

[1]MP10-52 available from Pfizer, D/T = 9.0.
[2]MP12-50 available from Pfizer, D/T = 13.8.
[3]MP25-38 available from Pfizer, D/T = 9.5.

Example 4

Runs 14, 15 and Comparatives c and d

The blend of polycarbonate and ABS resins from Example 1 was blended with 4 different talcs in amounts from 6 to 10 percent. Dart impact tests and CLTE were conducted on 5"×5" (12.5×12.5 cm) plaques of the resulting blends and the unmodified polycarbonate/ABS blend. The 4 fillers were MP50-26 (D/T =6.2, 98 percent <44 μm, 1₁) run 14: MP25-38 (D/T =9.5, 99.99 percent <44 μm, 12) run 15: MP99-10 (D/T =5.7, 57.4 percent <44 μm, 13) comparative c: and MP99-54 (D/T = 1.8, 98.0 percent <44 μm, 14) comparative d. All talcs were obtained from Pfizer. DTUL value for all samples was 255° F. (124° C.). The CLTE and dart impact resistance respectively.

Figure 2:
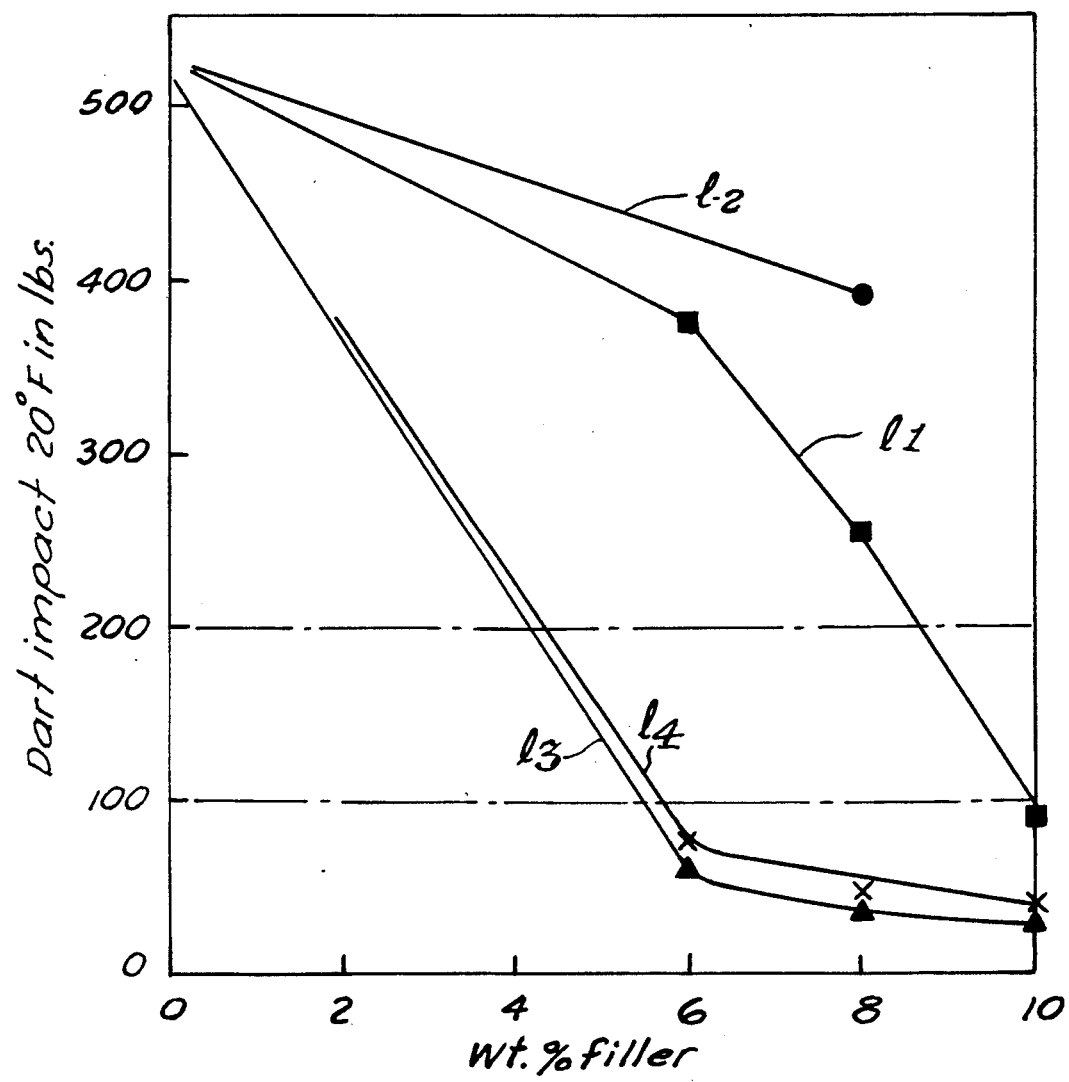
FIG. 2 shows the relationship between dart impact strength and amount of added filler for 4 selected fillers further defined in Example 4.

As may be seen by reference to FIGS. 1 and 2, increasing percentages of filler result in products having reduced CLTE, however, dart impact strength is simultaneous requirements of CLTE of less than 3.9 and dart impact ($-20°$ F.) ($-29°$ C.) of at least 100 in-lbs (11.3 joules).

Example 5

Runs 16-22, Comparison e

An N-phenylmaleimide modified ABS resin, and an emulsion ABS resin were blended with polycarbonate. The N-phenylmaleimide modified ABS had a composition of 19 percent AN, 6.5 percent butadiene, 63 percent styrene, and 11.5 percent N-phenylmaleimide and was prepared by solution polymerization of the monomers in the presence of dissolved polybutadiene rubber. This ABS was then compounded with 20 percent of an emulsion ABS containing 50 percent polybutadiene rubber grafted with 50/50 styrene/acrylonitrile copolymer. The polycarbonate was a bisphenol A polycarbonate, having a melt flow rate of 10 (CALIBRE 300-10 available from The Dow Chemical Company).

Various clay and talc fillers are incorporated into the polymer in amounts from 4 to 10 percent by weight. Results are contained in Table 4.

TABLE 4

| Run | Polycarbonate (%) | ABS (%) | Filler (%) | DTUL (°C.) | Dart Impact (In Lbs) | CLTE ×10⁻⁵/°F. |
|---|---|---|---|---|---|---|
| 16 | 61.75 | 33.25 | 4[2] | — | 657 | 3.82 |
| 17 | 61 | 33 | 6[1] | 133 | 370 | 3.43 |
| 18 | 61 | 33 | 6[2] | — | 544 | 3.78 |
| 19 | 61 | 33 | 6[3] | 132 | 445 | 3.46 |
| 20 | 59.8 | 32.2 | 8[1] | — | 314 | 3.51 |
| 21 | 59.8 | 32.2 | 8[3] | — | 270 | 3.10 |
| 22 | 58.5 | 31.5 | 10[1] | — | 366 | 3.25 |

TABLE 4-continued

| Run | Polycarbonate (%) | ABS (%) | Filler (%) | DTUL (°C.) | Dart Impact (In Lbs) | CLTE ×10⁻⁵/°F. |
|---|---|---|---|---|---|---|
| e | 65 | 35 | 0 | — | 549 | .3.97 |

[1] Tex 10R clay available from Anglo American Clay Co. D/T = 14.3, 99.99 percent of particles have diameter <44 μm.
[2] XF 3600 clay available from Anglo American Clay Co., D/T = 16.3, 99.99 percent <44 μm.
[3] MP10-52 talc available from Pfizer, D/T = 9.0, 99.99 percent <44 μm.

What is claimed is:

1. A filled polymeric blend comprising:
   (A) from 50 to 80 percent by weight of an aromatic polycarbonate;
   (B) from 5 to 46 percent by weight of a rubber modified homopolymer or copolymer of a vinyl aromatic monomer:
   (C) from 4 to 18 weight percent of an inorganic filler selected such that at least 98 percent of the particles thereof in final blend have a diameter less than 44 pm and an average diameter to thickness ratio from 4 to 24,
   said blend having a coefficient of linear thermal expansion (CLTE) of $3.9 \times 10^{-5}/°$ F. ($7.0 \times 10^{-5}/°$ C.) or less, a dart impact ($-20°$ F.) ($-29°$ C.) of at least 100 in lb (11.3 joules); and a heat distortion under load (DTUL) per ASTM D-648-82 at 66 psi (455 kPa) of at least 230° F. (110° C.).

2. A polymer blend according to claim 1 having a CLTE of $3.7 \times 10^{-5}/°$ F. ($6.7 \times 10^{-5}/°$ C.) or less.

3. A polymeric blend according to claim 1 having a dart impact at $-20°$ F. ($-29°$ C.) of at least 200 in lbs (22.6 joules)

4. A polymeric blend according to claim 1 comprising from 55 to 75 percent by weight of aromatic polycarbonate and 10 to 40 percent by weight rubber modified homopolymer or copolymer.

5. A polymeric blend according to claim 1 wherein 99 percent of the filler has a particle diameter less than 20 μm.

6. A polymeric blend according to claim 1 wherein the filler has an average diameter/thickness ratio of from 6 to 18.

7. A polymeric blend according to claim 1 wherein the filler is selected from the group consisting of talc and uncalcined clay.

8. A polymeric blend according to claim 1 wherein the rubber modified copolymer comprises a copolymer of styrene and aorylonitrile and optionally N-phenylmaleimide and the rubber is a homopolymer or copolymer of butadiene or an interpolymer of ethylene, propylene and a nonconjugated diene.

9. A fabricated article comprising a polymeric blend according to claim 1.

* * * * *